United States Patent [19]

Shigyo et al.

[11] Patent Number: 5,417,730
[45] Date of Patent: May 23, 1995

[54] APPARATUS FOR MOLDING AN OPTICAL ELEMENT

[75] Inventors: Isamu Shigyo, Chiba; Hiroyuki Kubo, Tokyo; Nobuaki Onoda, Utsunomiya; Nobuyuki Nakagawa, Kawasaki, all of Japan

[73] Assignee: Canon Kabushiki Kaisha, Tokyo, Japan

[21] Appl. No.: 195,840

[22] Filed: Feb. 14, 1994

Related U.S. Application Data

[63] Continuation of Ser. No. 902,857, Jun. 23, 1992, abandoned.

[30] Foreign Application Priority Data

| Jun. 25, 1991 | [JP] | Japan | 3-178904 |
| Jun. 26, 1991 | [JP] | Japan | 3-180492 |
| Jun. 28, 1991 | [JP] | Japan | 3-184167 |
| Jul. 10, 1991 | [JP] | Japan | 3-195063 |
| Jul. 10, 1991 | [JP] | Japan | 3-195064 |
| Jul. 10, 1991 | [JP] | Japan | 3-195065 |
| Jul. 18, 1991 | [JP] | Japan | 3-202312 |
| Jun. 10, 1992 | [JP] | Japan | 4-175069 |

[51] Int. Cl.$^6$ .................. C03B 11/00; C03B 11/12; C03B 11/06
[52] U.S. Cl. .................. 65/111; 65/305; 65/318; 65/319; 65/320; 65/362; 425/406
[58] Field of Search .................. 65/305, 308, 317, 318, 65/319, 320, 66, 68, 102, 111, 215, 223, 226, 374.15, 375.13, 374.11, 362; 425/406, 407, 413, 419, 452, 808

[56] References Cited

U.S. PATENT DOCUMENTS

| 2,901,865 | 9/1959 | McCormick | 65/317 |
| 3,005,234 | 10/1961 | Oriani et al. | 65/318 |
| 3,390,974 | 7/1968 | Parsons et al. | 65/362 |
| 3,761,220 | 9/1973 | Dirne | 425/407 |
| 3,833,347 | 9/1974 | Angle et al. | 65/68 |
| 3,975,127 | 8/1976 | Munk et al. | 425/407 |
| 4,251,253 | 2/1981 | Becker et al. | 65/319 |
| 4,606,705 | 8/1986 | Torii et al. | 65/374.15 |
| 4,629,489 | 12/1986 | Hirota et al. | 65/102 |
| 4,778,505 | 10/1988 | Hirota et al. | 65/102 |
| 4,797,144 | 1/1989 | DeMeritt et al. | 65/68 |
| 5,073,099 | 12/1991 | Kayano | 425/407 |
| 5,160,361 | 11/1992 | Murata et al. | 65/102 |
| 5,173,100 | 12/1992 | Shigyo et al. | 65/102 |
| 5,211,969 | 5/1993 | Yoshimura | 65/305 |
| 5,250,099 | 10/1993 | Kubo et al. | 65/102 |

FOREIGN PATENT DOCUMENTS

| 64-24029 | 1/1989 | Japan | 65/102 |
| 4-83725 | 3/1992 | Japan | 65/102 |
| 4-331724 | 11/1992 | Japan | 65/102 |

Primary Examiner—W. Gary Jones
Assistant Examiner—Steven P. Griffin
Attorney, Agent, or Firm—Fitzpatrick, Cella, Harper & Scinto

[57] ABSTRACT

A press molding apparatus produces an optical element of high precision efficiently in such a way that an upper mold member is at least slidably operated relative to a shell mold, and the force of an operation member to be applied onto the upper mold member is exerted through the center of the upper mold member when press molding the glass material and releasing the molded optical element. The press molding apparatus in which glass material in a softened state is pressed within a shell mold using mold members slidable with the shell mold and an optical functional surface corresponding to a molding surface of each of the mold members is formed on the glass material is constructed such that at least the upper mold member slidable within the shell mold is operated via a pressing plate by an operation member so as to exert a pressure parallel to a sliding face of the shell mold at its center, and a hook member hung on the operation member is interlocked via alignment means so as to exert a central lifting force.

13 Claims, 14 Drawing Sheets

APPARATUS FOR MOLDING AN OPTICAL ELEMENT

This application is a continuation of application Ser. No. 07/902,857, filed Jun. 23, 1992, now abandoned.

BACKGROUND OF THE INVENTION

Field of the Invention

The present invention relates to a press molding apparatus for an optical element for use in forming a high-precision optical element such as an aspherical lens.

Related Background Art

Recently, instead of an optical element forming method with grinding and polishing, a method has been noted in which molding optical glass material heated and softened is directly press molded within a mold.

Normally, in this type of molding, a press molding apparatus is used in which a glass material in a softened state is pressed within a shell mold, using mold members slidable with the shell mold, and an optical functional surface corresponding to a molding surface of each mold member is formed in the glass material. In order to obtain an optical element with a desired degree of precision, it is important to align the center of the optical functional surface of the optical element to be formed with the optical axis of the molding surface of each mold member, in such a manner that the mold members are pressed completely by the time the press is completed and the clearance between the shell mold and each mold member is as small as possible.

In the molding apparatus as above described, for the temperature control of a glass material in the press molding process, it is necessary to heat and cool the shell mold and upper and lower mold members with considerable differences between high and low temperature. For this purpose, the shell mold and the upper and lower mold members are made of materials having substantially the same thermal expansion coefficients, and a clearance is provided to secure the sliding of each mold member with respect to the shell mold. Therefore, for example, when the upper mold member is lowered to press mold the glass material with the lower mold member, the upper mold member may be inclined during sliding within the shell mold, unless the pressure is not applied on the center of the upper mold member, so that the glass material can not be press molded in a state where the upper and lower mold members are correctly aligned with each other. Further, in an extreme case, there occurs some scuffing between the shell mold and the upper mold members, so that the complete closing of the mold members is impossible and thus the normal pressing can not be performed. In other words, as a result, the center of the optical functional surface of a formed optical element is not aligned with the optical axis. When the upper mold member is lifted upon taking out the molded product, the upper mold member may be inclined if an off center lifting force is exerted, thereby causing a scuffing between the shell mold and the upper mold member, so that the mold members can not be opened or closed. Such a molding apparatus has a clearance in a sliding portion between the shell mold and the upper mold members as small as 10 $\mu$m or less under practical use condition, and is used in the hot conditions, whereby scuffing is more likely to occur.

SUMMARY OF THE INVENTION

The present invention has been achieved based on the above affairs, and aims to provide a press molding apparatus for an optical element capable of producing an optical element of high precision efficiently, in such a way that the upper mold member is at least slidably moved relative to the shell mold, and the force of an operation member to be applied onto the upper mold member is exerted through the center of the upper mold member at any time, upon press molding of the glass material and releasing of the molded optical element.

Therefore, this invention provides a press molding apparatus for an optical element wherein a glass material in a softened state is pressed within a shell mold, using mold members slidable with the shell mold, and an optical functional surface corresponding to a molding surface of each mold member is formed on the glass material, the apparatus being constructed such that at least the upper mold member slidable within the shell mold is operated via a pressing plate by an operation member, so that the pressure may be exerted parallel to a sliding face of the shell mold at the center of the upper mold member, and a hook member hung on the operation member is interlocked via alignment means so that the lifting force may be exerted at the center thereof.

Further, an object of the present invention resides in forming a plurality of moldings at the same time.

The method of pressing a plurality of molds at the same time is one in which the plurality of molds are pressed along one pressure axis, using a pressing member such as a plate secured orthogonally to the sliding direction of the molds. With such a method, the stroke for all the molds can be determined by that of a mold having the shortest stroke among the plurality of molds. Therefore, in order to form an optical element requiring precision in thickness or in facial inclination as small as microns, it is necessary to control sufficiently the dimensions of each mold, the dimensions of the pressing member, the inclination of the pressing member in mounting or pressing it, abrasion and deformation in contact section of the pressing member with the molds so that the strokes may be all included within a specified standard. But it is almost impossible to control such items including the deformation of a molding apparatus under the molding conditions at temperature as high as several hundreds degrees. To this end, it is necessary to assure such a precision with the precision for the upper mold, the shell mold, and other mold components upon making the upper mold abut against the shell mold. However, with the above-described pressing method, it is also substantially impossible to press all the molds at the same time, due to the same reason as described above that the strokes are identical for all the molds. Also, a method can be considered in which the pressing member is pressed in some degree of freedom without fixing it, but when a plurality of molds, in particular, four molds, are pressed at the same time, it is not allowed to press all the molds at the same time unless the height of each mold completely pressed is on the same plane. Also, since the pressing start position and the molding speed (deformation speed of glass) may be different on each mold due to dispersion in the size of molding material or minute temperature difference in pressing each mold, there frequently occurs a situation in which the pressing member is pressed at an incline with respect to the sliding direction of the molds. Therefore, the pressing force may act also in other than the sliding direction of the molds, thereby incurring the scuffing or breakage of the mold, and further, the contact section of the pressing member with the molds is always rubbed and easily worn away. In particular, under such high temperature conditions, it is more severely worn away, so that repetitive vicious circles of aggravating scuffing or breakage of the mold occurs due to the resulting abrasion.

In view of the above reasons, a pressing method of preparing a plurality of pressure axes each corresponding to each mold is most ideal, but since the molding of such an optical element is necessary to be performed within a closed vessel furnace which is capable of maintaining the non-oxidizing atmosphere to prevent the oxidation of the mold, the distance between each pressure axis can not be rendered small, considering the problems associated with the axis seal of the pressure axis and the mounting space for the pressing force generation mechanism, so that the molding apparatus itself and thus the distance between each mold are rendered larger, thereby yielding a larger heat capacity of the mold to incur a situation in which it takes some time to heat and cool. So, the advantage of greatly increasing the number of products owing to simultaneous molding with the plurality of molds may be cut in half, and occasionally there occurs an increase in molding time, a decrease in the number of products or an increase in the manufacturing cost owing to the larger and more complex molding apparatus.

The present invention has been made to resolve the above-mentioned problems, and aims to provide a method for pressing a plurality of molds stably and efficiently within a tolerance of pressure range required for the molding, without causing the above-mentioned problems even when the dimension between each mold is very small owing to the presence of one pressure axis and pressure generation mechanism.

Further, another object of the present invention is to provide a novel apparatus for the molding process capable of obtaining a plurality of glass moldings at the same time in the pressing operation within a molding chamber by accommodating a plurality of glass plates into the molding chamber. The apparatus of obtaining a plurality of glass molded products by molding a plurality of glass plates by means of a plurality of mold sets consisting of upper and lower molds and/or shell molds, is constructed by installing a plurality of mold set within the molding chamber and applying a pressing load onto each mold set.

A problem in this case is that nonuniform load may act on a plurality of glass plates unless uniform load is applied on mold members of the plurality of mold sets, in particular, a plurality of upper mold members. Thereby the moldings may contain some error in the dimension accuracy and finishing accuracy, resulting in defectives.

The present invention has resolved the above-mentioned problem by applying a pressure load via spring means onto each upper mold member of a plurality of mold sets.

Further, another problem of the present invention is associated with the exchange of the mold members within the molding chamber. In a molding process of press molding the glass material with mold members while heating the glass material, in order to mold the glass material from the blank in the precision of final molding, it is necessary to exert a load as great as several hundreds Kg on the mold members at high temperatures of 500° to 700° C. for the glass material and the mold members. After the glass material and the mold members are press molded while being maintained at such a high temperature, the glass molding is cooled down to an ejection temperature without yielding deformation of the glass molding. Because of the problems associated with the heat influence of mold members due to the high temperature heating and cooling of the mold members, the adherence of glass onto molding surface of the mold member, and contaminations sticking to glass blank, it is necessary to exchange the mold members for cleaning.

A problem for exchanging mold members is that each process of carrying the glass material into the molding chamber, molding with the mold members, and taking out the molding must be performed in a skillful manner in a predetermined cycle in order to perform said molding process for glass the molded product under conditions of high temperatures of the glass material and the mold member. To this end, the exchanging operation of mold members must be performed in a short time. The present invention has been proposed to resolve the problem of mold exchange as above described.

Hence, in the present invention, in a mold exchange mechanism for the press molding apparatus, wherein the mold is carried into or out of the press molding position corresponding to a press operation mechanism, a mold exchange chamber is communicated via a gate valve to a molding chamber in a predetermined atmosphere where the press operation mechanism is installed, and the mold exchange chamber is equipped with switching means for switching a pallet for placing and securing the molding thereon along a guide rail between both chambers, and pallet replacement means for replacing new and old pallets at a switching position of the pallet with the switching means within the mold exchange chamber.

A further object of the present invention resides in the following point.

An apparatus for use in the molding process of the present invention is a press molding apparatus for an optical element, wherein a glass material in a softened state is pressed within a shell mold by using mold members slidable with the shell mold so as to form an optical functional face corresponding to a molding surface of the mold member on the glass material. In this case, the mold members are preinstalled on the pallet, and matched indirectly with the press operation mechanism by conveying and installing the pallet into press molding position corresponding to the press operation mechanism. This is intended to avoid the decrease in the availability because when the mold exchange is required due to the damage of molding, the exchange operation can be made simply in a shorter time. In particular, when the press molding is performed in an inert gas atmosphere, the movement of the mold from the mold exchange chamber to the molding chamber, or from the molding chamber to the mold exchange chamber is troublesome, and therefore, there is great merit if the movement operation is performed with the molding placed on the pallet.

However, when the pallet is positioned at a press molding position with the molding placed on the pallet, as above described, the matching between the press operation mechanism and the mold is difficult. This is because the press operation center of the press operation mechanism may be deviated from the center of the mold if the pallet is thermally expanded under the influence of ambient temperature, as position setting members such as pin guides against which the pallet is caused to abut are used in positioning the pallet.

The present invention has been achieved in view of the above affairs, and aims to provide a position setting apparatus for the mold, wherein the pallet is maintained at a predetermined temperature so as not to be affected by the ambient temperature, the positional deviation of the mold due to the thermal expansion is avoided, and the matching between the press operation mechanism and the mold can be assured.

Therefore, the present invention provides a press position setting apparatus for the mold, wherein the molding is placed on the pallet, which is then positioned at a press molding position corresponding to the press operation mechanism. The apparatus comprises, at the press molding position, a position setting member against which the pallet is caused to abut and thermostatic and adiabatic means for maintaining the pallet at a predetermined temperature.

DESCRIPTION OF THE PREFERRED EMBODIMENTS

Figure 1:
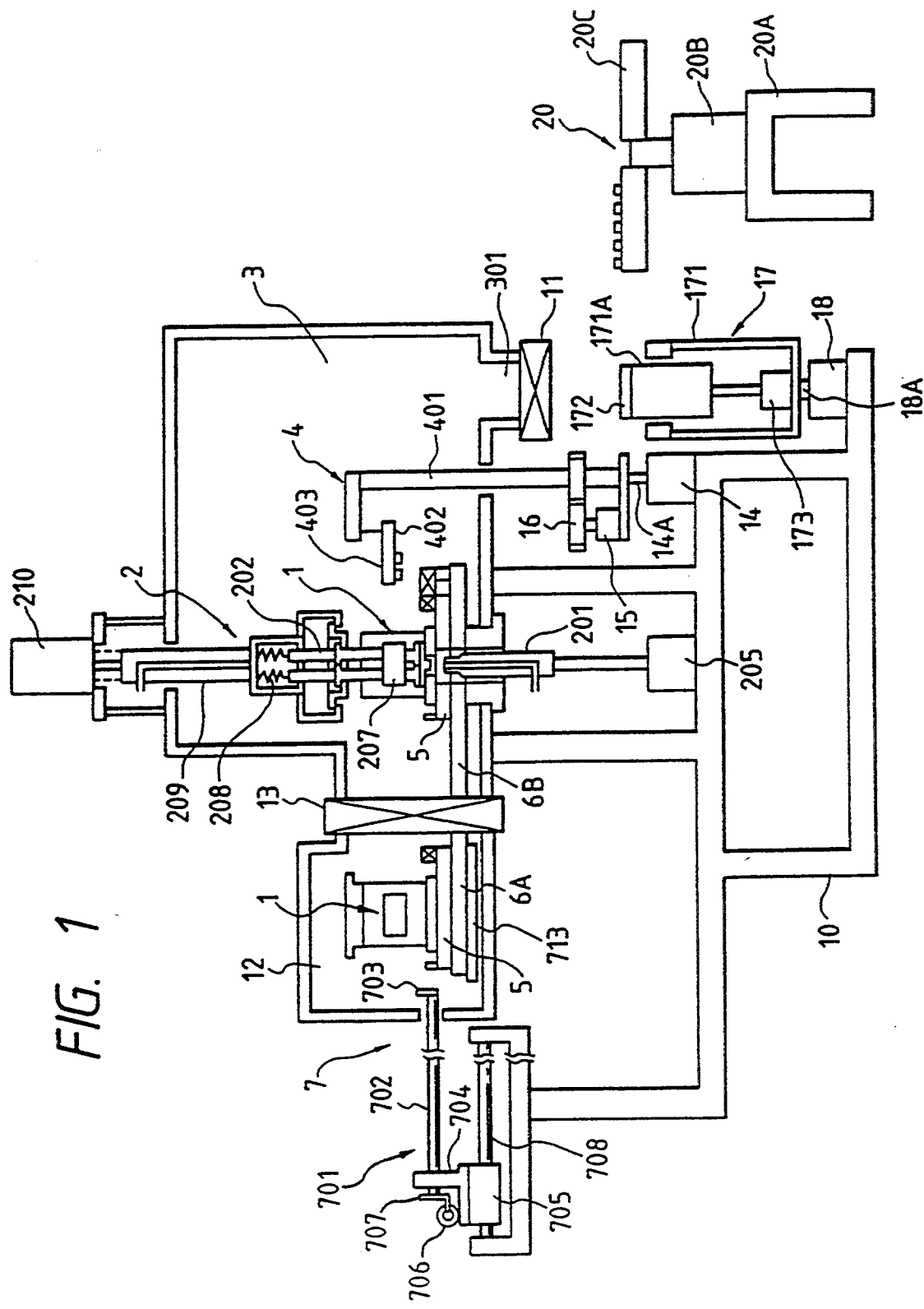
FIG. 1 is a schematic elevational view of a press molding apparatus according to one embodiment of the present invention.
Figure 2:
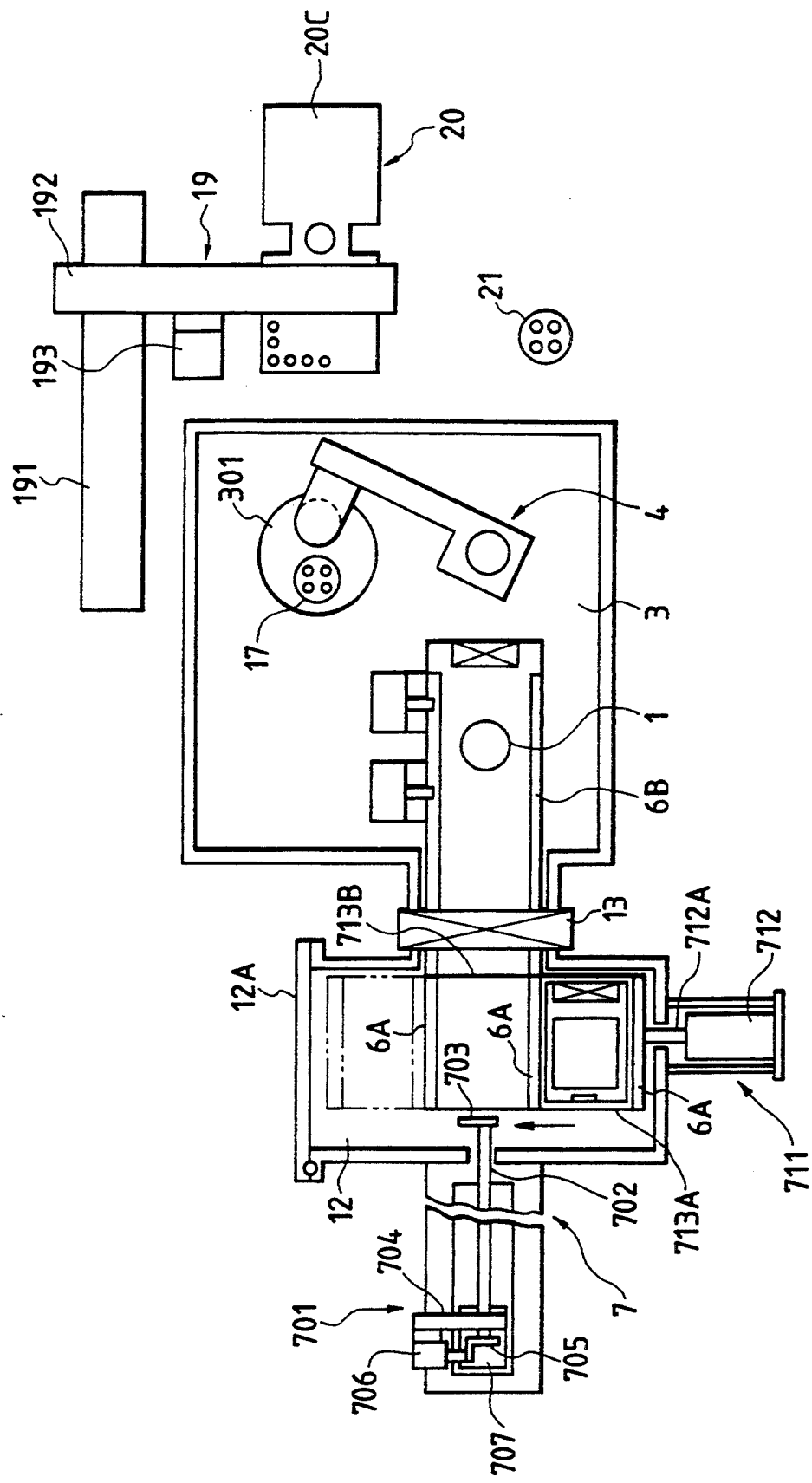
FIG. 2 is a schematic plan view of a press molding apparatus according to the present invention.

The embodiments of the present invention will be described below with reference to the drawings. As shown in FIGS. 1 and 2, a press molding apparatus is constructed so that a glass material (glass blank) is put into a mold 1 and a movable portion (described below) of the mold 1 is operated with the operation of a press operation mechanism 2 to perform press molding. The press molding is preferably performed in an inert gas atmosphere such as a nitrogen gas atmosphere. To this end, the mold 1 and the press operation mechanism 2 are mounted within an air-tight molding chamber 3.

The molding chamber 3 is disposed on a frame 10, and has a gate valve at an inlet/outlet port 301 through which the glass material or the molded product is carried into or out of the chamber, for the communication to the exterior. Also, on the frame 10, a mold exchange chamber 12 is disposed adjacent to the molding chamber 3, and is communicated via the gate valve 11 to the molding chamber 3.

Within the molding chamber 3, there is disposed switching means 4 for introducing the glass material into and out of the mold 1. The switching means 4 is such that suction hand 402 constituting glass-molded product introducing taking-out means is mounted on an upper end of a rotation shaft 401 extending though a floor of the molding chamber 3 and vertically introduced from the exterior into the molding chamber 3, and a suction pad 403 is provided at a top end of the suction hand 402. The rotation shaft 401 is rotatably connected to a piston rod 14A of a cylinder mechanism 14 provided on the frame 10. The rotation shaft 401 is operated axially upward or downward with the operation of the piston rod 14A, and rotated via a gear train 16 by means of an electric motor 15 provided on the piston rod 14A.

In a state that the glass material is sucked on the suction pad 403, the suction pad 403 is introduced into the mold 1 with the axial and rotational operations of the rotation shaft 401 based on the control of the cylinder mechanism 14 and the rotational control of the electric motor 15. Also, the suction pad 403 is taken out from the mold 1 with the axial and rotational operations of the rotation shaft 401 in an opposite direction in a state that the molded product is sucked on the suction pad 403.

Downwardly of the inlet/outlet port 301 and on the frame 10, there is disposed means 17 for carrying the glass material into and the molded product out of the molding chamber 3. The carrying in/out means 17 has a switching chamber 171 attached to the piston rod 18A extending upward from the cylinder mechanism 18, and a stand 172 capable of entering and exiting vertically through an opening 171A provided at an upper end of the switching chamber 171. The stand 172 is able to be elevated with elevating means 173 (e.g., a piston cylinder mechanism) provided within the switching chamber 171.

When the glass material or the molded product is carried into or out of the molding chamber 3, the piston rod 18A is raised under the control of the cylinder mechanism 18, with the glass material placed on the stand 172, thereby raising the switching chamber 171, so that the opening 171A is brought into an air-tight contact with the gate valve 11. In this state, the inside of the switching chamber 171 is replaced with a predetermined atmosphere. The gate valve 11 is then opened to communicate the molding chamber 11 with the switching chamber 171. The stand 172 is introduced into the molding chamber 3 by means of the elevating means 173, whereby the delivery of the glass material or the reception of the molded product is performed by the switching means 4. Thereafter, the elevating means 73 is reversely operated to return the stand 172 to the switching chamber 171, the gate valve 11 is then closed, and the switching chamber 171 is lowered with the operation of the cylinder mechanism to receive the molded product from the stand 172 or deliver a new glass material thereto.

In this embodiment, a robot 19 is used to deliver the glass material onto the stand 172 or receive the molded product therefrom. The robot 19 acts to make the replacement with a glass material from a stocker 20 onto the stand 172, as well as conveying the molding from the stand 172 to a desired place, using suction means. That is, the robot 19 has an X-axis arm 191 and a Y-axis arm 192, and can shift the suction hand 193 provided on the Y-axis arm 192 in the X and Y directions, with the operation of both arms. The stocker 20 is such that an electric motor 20B is provided on a frame 20A and a pallet 20C is secured to its rotational axis, serving to receive the molded product and deliver the glass material at a position corresponding to the robot 19 by rotating the pallet 20C with the driving of the electric motor 20B. In this embodiment, a cooling platform 21 is provided on which the molded product taken out of the stand 172 with the suction hand 193 is temporarily placed to cool naturally or forcedly down to a desired temperature.

Molding Apparatus

The molding apparatus will be described below with reference to FIGS. 3, 4, 5, 6, 7 and 8. The pallet 5 is secured on the guide rail 8, and a bottom plate 100D threadingly engaged with the shell mold 100 is laid on the pallet 5. The shell mold 100 or guide member, is of rectangular parallelopiped shaped, in which an opening portion 100A extending therethrough is provided in a direction from the paper surface of FIG. 3 to the back side. Four through holes or guide holes, are provided in a ceiling section $100B_1$ upward the opening portion 100A of rectangular parallelopiped. Four upper mold members 102, 102, 102 and 102 are fitted into the through holes, respectively.

At the bottom portion $100B_2$ of the rectangular parallelopiped shell mold are provided holes into which four lower mold members 101, 101, 101 and 101 corresponding to the respective upper mold members are fitted.

A notch portion 100E is provided at the bottom portion $100B_2$ of the shell mold, and has an ejection member 207 disposed therein. On an upper surface of the ejection member 207 are provided four projection portions 207a, on which spacers 100F or movement stroke adjusting members, are placed. On each of the spacers 100F is laid each lower mold 101 to 101. Four projection portions 207a to 207a of the ejection member 207 have an effect of causing the pressure force to act on the center of the axis of each lower mold and preventing the pressure force on the lower mold from deviating, when the ejection member 207 is ejected upward by a lower mold pressure rod 201.

Each spacer 100F serves to adjust the dispersion in the dimensional precision in an axial direction of each lower mold member.

One of the features of the present invention is that four products are press molded at the same time by a plurality of, for example, four upper and lower mold sets. The four upper mold members are loaded with a total weight of 2400 kg as described below. It is desirable that even weight is applied on each upper mold member. However, due to the dispersion in the finishing dimensional precision for each member of the upper mold, the lower mold and the shell mold, the movement stroke for molding of glass material with the upper and lower mold members may be different between four mold sets to some extent. For the adjustment of this stroke, the spacers are provided.

Figure 4:
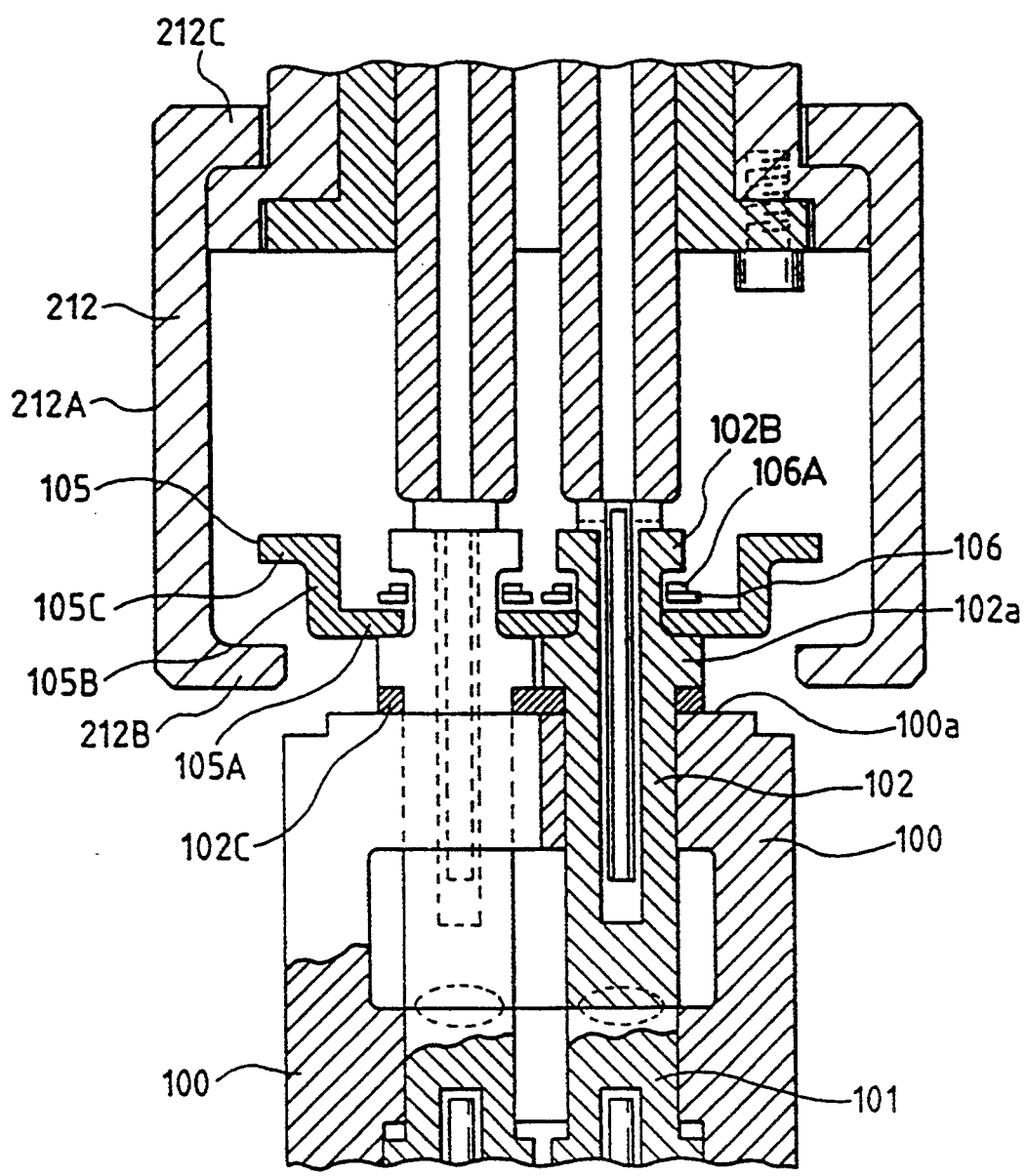
FIG. 4 is a cross-sectional view showing the essential parts, taken along the lines A1—A1 and A2—A2 of FIG. 3.

The lower mold pressure rod 201, the bottom plate 100D, the ejection member 207, and the spacers 100F are provided with respective passages for supplying a cooling medium into each lower mold member. A larger diameter portion 102a as well as a flange portion 102b at an upper end are provided on each upper mold member 102. (FIG. 4)

Numeral 105 is a lifting member for lifting four upper mold members 102 to 102 at the same time, having a disk portion 105A, a barrel portion 105B, a flange portion 105C, and four holes for fitting four upper molds into the disk portion 105A.

Alignment Means

Numeral 106 is an alignment member, which is disposed between the disk portion 105A of the lifting member and the flange portion 102b of the upper mold.

Figure 6:
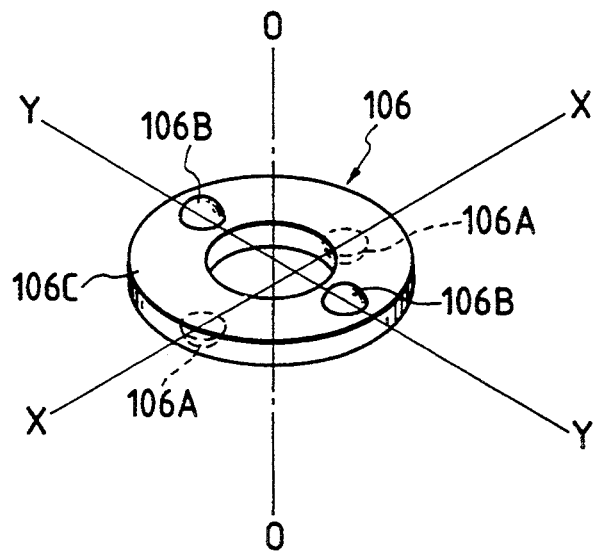
FIGS. 6 and 7 are views showing an alignment member.
Figure 7:
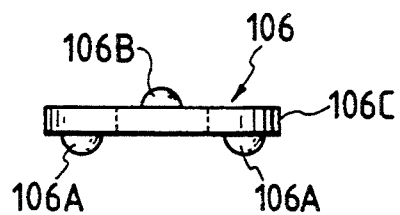
Figure 8:
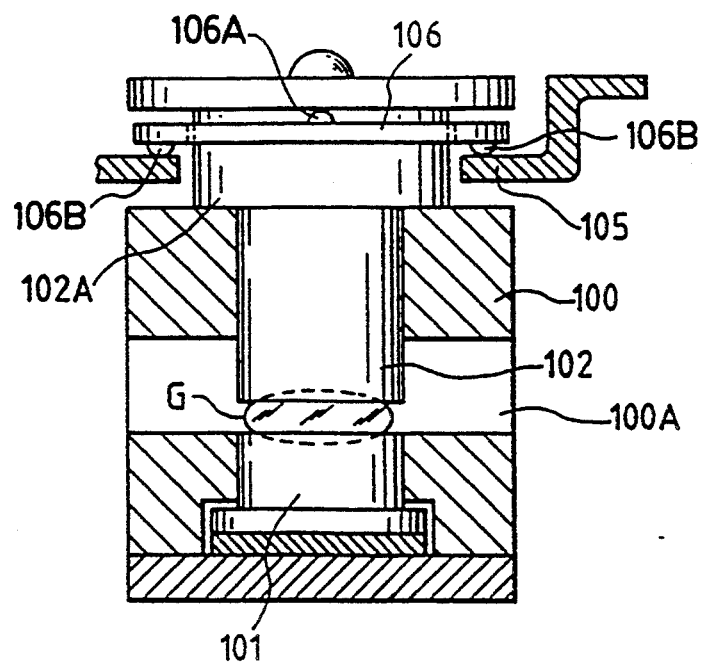
FIG. 8 is an explanation view showing the alignment member.

The alignment member 106 is shaped like a ring, as shown in FIGS. 6 and 7. Projections 106A, 106A and 106B, 106B are provided on upper and lower surfaces of the ring portion 106C, respectively, two projections on each surface. The projections on the upper and lower surfaces are disposed at right angles to each other with respect to the center. In FIG. 4, the alignment member 106 is placed on the upper surface of the disk portion in the lifting member 105, while being fitted into a shank of the upper mold member. The projections 106B, 106B (not shown in FIG. 4) are placed in contact with the upper surface of the lifting member (FIG. 8). Numeral 212 shows a hook member in lifting the lifting member 105 upward as shown in FIG. 4, having a support portion 212A, a lower end hook portion 212B, and an upper end hook portion 212C. The lower end hook portion 212B is engageable with the flange portion 105C of the lifting member 105, and the upper end hook portion 212C is engageable with a holder block 203 as thereinafter described.

One of the features of the present invention is that a plurality of moldings are made at the same time with a plurality of upper and lower mold sets. In the apparatus of this embodiment, after the glass material is press molded by four upper molds 102 to 102 and four lower molds 101 to 101 to form a lens, each upper mold is lifted upward to take out the molding lens from between the upper and lower molds, and the molding left on the lower mold is taken out through the opening portion 100A of the shell mold.

In this case, there are two methods of lifting each upper mold one by one and lifting four molds at the same time (each two molds can be also lifted).

In order to raise the productivity per time, the operation of lifting four molds at the same time is performed in this embodiment. In this embodiment, the alignment member 106 performs the alignment of four upper molds. That is, if the hook member 212 is lifted upward as shown, the lower end hook portion 212B is placed in abutment with the flange portion 105C of the lifting member 105, so that the lifting member 105 is elevated.

In FIGS. 6 and 8, when the lifting member 105, or movement member, is raised, the lifting member 105 comes into point contact with the alignment member 106 in a plane in an X-X direction with respect to the axis 0-0 by the projections 106B, 106B on the lower surface of the alignment member. Further, a plane in a Y-Y direction orthogonal to the X-X direction comes into point contact by contact of the projections 106A, 106A on the upper surface of the alignment member with the flange portion 102B of the upper mold, whereby the upper mold 102 can be lifted while two planes X-X and Y-Y orthogonal with respect to the axis 0-0 which lies in a raising direction of the lifting member are maintained in a mutually orthogonal state. Thereby, it is possible to prevent the inclination of the upper mold relative to the axial line 0-0 in lifting. And it is also possible to prevent the "scuffing" in the sliding of the mold.

When a glass blank is laid on each lower mold again to further make the press molding, after the upper mold is lifted by the hook member and the molded product is taken out, the hook member is lowered, and then the upper mold is lowered via the lifting member and the alignment member while being slid in the through hole of the shell mold.

In this case, it is necessary to slidingly move the four upper molds at the same time without yielding any "scuffing" with the shell mold, but this has been made possible by the action of the alignment member 106.

In the lifted state of each upper mold, each upper mold is maintained by the lifting member and the alignment member in such a state that two orthogonal planes X-X and Y-Y with respect to the axis 0-0 is in the orthogonal state.

If the hook member 212 is lowered from this state, the upper mold, the alignment member and the lifting member will lower due to their dead weights, and when each upper mold lowers, the orthogonal state as previously described can be retained, so that it is possible to prevent the scuffing.

Upper Mold Pressure Mechanism

Numeral 104 is a pressing plate member provided on an upper plane of the flange portion 102 for each upper mold member, serving to exert a pressing load on an upper mold pressure rod 202 (as described below) concentratedly in an axial direction of each upper mold.

It is constructed that the pressing load of the rod 202 is received in a point contact state. Numeral 203 is referred to as a holder block. The holder block 203 has a shank 203A, a lower end flange portion 203B and an upper end flange portion 203C, and four through holes 203a to 203a provided on the shank 203A. Numeral 203D is a cylindrical member fitted around an inner circumference of the holder block 203 in the lower part thereof. The lower end portions of the four upper mold pressure rods 202 to 202 are placed into contact with the pressing plate 104 as previously described, and the portions 202A at upper ends have their outer circumferences fitted into the respective four through holes 203a to 203a formed on the holder block. Cooling pipes (not shown) are inserted into each through hole 203a to 203a of the holder block, which is joined at its upper end to a medium supply port of a cooling medium distributing plate 222, and inserted at its lower end into a through hole formed on the upper mold pressure rod 202 to 202.

A clearance shaped like a ring in cross-section is provided between each through hole 203a to 203a of the holder block 203 and each cooling pipe, and a pressure adjusting mechanism is incorporated into each clearance 203e to 203e.

Pressure Adjusting Mechanism

Figure 3:
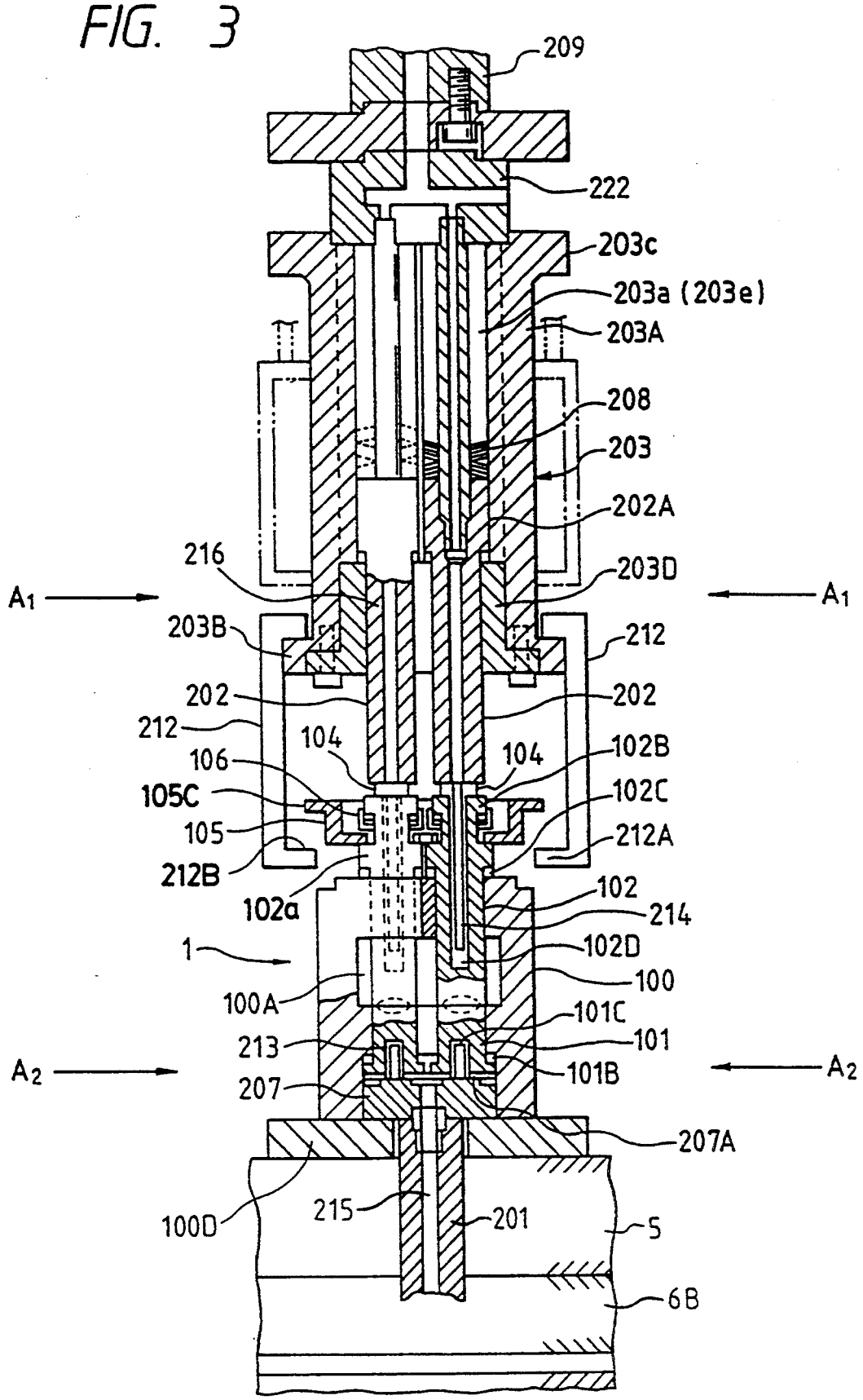
FIG. 3 is a cross-sectional elevational view showing the essential parts of the present invention.

The pressure adjusting mechanism is constituted of a plurality of conical springs 208 inserted into the clearance 203e and the upper mold pressure rod 202. One of the features of the present invention is to provide an apparatus which can produce a plurality of molded products at the same time with a plurality of upper and lower mold sets. To this end, it is necessary to apply uniform pressing load on the four mold sets. In the apparatus as shown in FIG. 3, the pressure of the upper mold pressure cylinder is received via the cylinder rod 209 on the cooling medium distributing plate 222. The pressing force against the distributing plate 222 is exerted via four upper mold pressure rods 202 to the four upper molds 102 to 102. In this case, it is desirable that the pressing force (2400 kg in total load) of the distributing plate 222 is exerted on each upper mold uniformly, each with a load of 600 kg. If there is any dispersion of distributed load on each upper mold, the qualities of four molded products (e.g., dispersion in the lens thickness due to the pressure) may be affected.

Also, there is some dispersion in the size for four pairs of upper and lower mold members, and for the upper mold pressure rods, so the movement strokes of upper molds with the pressing force of the distributing plate 222 result in some differences, therefore, the movement amounts of upper molds differ from each other.

In order to heat and press the glass material to form a high-precision optical element in the present invention, it is necessary to apply a high pressure (400 kg to 600 kg) on each upper mold by transmitting it from the cylinder rod via members to each upper mold. Further, in an apparatus with a method of repeatedly performing the process of taking out the molded product after heating the glass material within the mold to a predetermined temperature (400° C. to 700° C.) for the pressure molding, it is required to shorten the heating-cooling-heating cycle because of repeating the heating and cooling for the molded product, the mold members, the shell mold and the like, so that the heat capacity in the whole molding apparatus, and thus the size of the apparatus, must be reduced.

Further, in the molding apparatus in this embodiment, to obtain the same molded product, for example, lenses of the same thickness, by the use of four pairs of mold members, the upper mold 102 is pressed by the upper mold pressure rod 202 so as to cause the lower end face of the larger diameter portion 102a in the upper mold to be pressed via spacer 102C against the upper end surface 100a of the shell mold 100, so that the movement position of the upper mold can be regulated, or stopped, and the thickness of the moldings can be determined.

It is a requirement of obtaining the thickness of four molded products that four upper molds 102 to 102 are all placed via spacers 102C into abutment with the upper end surface 100a of the shell mold. To this end, it is necessary to exert the pressing force independently against four upper molds, and to exert a sufficient pressing force on the upper mold so that each upper mold is completely in abutment with the upper end surface 100a of the shell mold.

Figure 9:
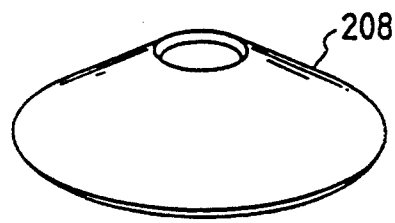
FIGS. 9 and 10 are explanation views for spring means.
Figure 10:
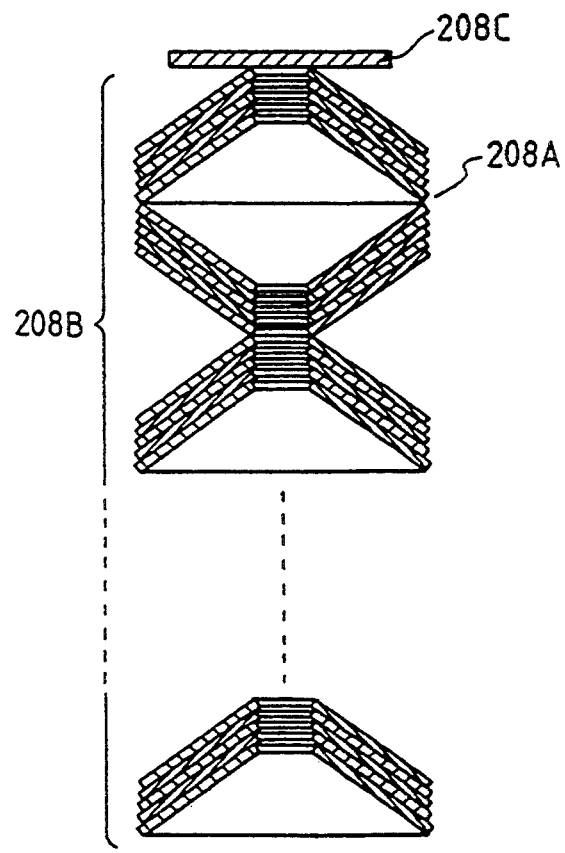

To resolve the above-mentioned problem, inventors have designed a pressure adjusting mechanism for the pressing force of the distributing plate 222 so that spring members, in particular, conical springs as shown in FIGS. 9 and 10 are inserted into the clearances 203e to 203e. That is, several pieces of conical spring 208 having a central portion opened and a divergent inverse conical shape are placed one on the other in the same direction as shown in FIG. 10, to form each one spring set 208A, and then spring means 208B is formed so that each spring set 208A is laid one on the other alternately in opposite directions, and inserted into each clearance 203e to 203e.

The spring means inserted into each clearance 203e to 203e will be flexed due to pressing force exerted from the distributing plate 222. The pressing force acts to press each upper mold from each upper mold pressure rod 202 via the spring means 208B. Each upper mold slidingly moves in the through hole of the shell mold until the larger diameter portion 102a of the upper mold comes into contact with the upper end surface 100a of the shell mold. In the four mold sets, when larger diameter portions 102a of three upper molds are placed into contact with upper end faces 100a of the shell mold, and even if the remaining one larger diameter portion 102a does not come into contact with the upper end face, the upper mold which has not been in contact state can be pressed against the upper end face of the shell mold by virtue of the spring means and the pressure rod by applying a load which is exerted by the pressing force from the distributing plate 222. Thus it is assured that the lowered positions for all the four upper molds can be fixed, whereby the consistent thickness of the molded product is maintained.

A specific example of a spring in the spring means will be now described.

Six pieces of conical spring 208 having an outer diameter of $\phi 18$ mm, an inner diameter of $\phi 9.2$ mm, a plate thickness of 1 mm, and a free height of 1.5 mm, were laid one on another in the same direction, to form a spring set 208A having a spring constant of k=2720 kg.f/mm capable of withstanding a load of 850 Kgf, and twenty such sets were further placed one on another alternately in opposite directions, whereby four units of spring unit 208B having a total length of about 130 mm and a spring contact of 136 Kgf/mm were provided. The dispersion in the total length were corrected. The thickness of the spacer 208C, or spring constant adjustment member was adjusted so as to provide a preload of 50 Kgf for prevention of looseness. The units were incorporated into the holder block 203 having the pitch between four axes being 20 mm, as shown. The measurement of the pressure dispersion between each press operation member 202 was made, with the thrust of cylinder rod (i.e., total pressing force applied on four upper molds 102) being set at 3200 Kgf. As a result, it was confirmed that the dispersion was within a range of 15 Kgf. A lens for video camera was molded under conditions of pressing pressure (one of the molding conditions) being 600 $\pm 40$ Kgf, using mold sets in which the dispersion in height up to a pressing plate 104 was adjusted within 0.2 mm. The molded lens has the finish size of $\phi 10$ mm, the central thickness of 3.5 mm, and the curvatures of lens face being 15 mm and 20 mm. As a result all the four molds were completely pressed substantially at the same time without causing any inconveniences such as scuffing, and finished molding was completely coincident with a cavity space formed in each mold, whereby the molded products sufficiently meeting the requirements of the precision of thickness and the tolerance in the inclination of optical face were obtained.

At an upper portion of the spring means, an adjustment member, or spacer, 208C is provided to compensate for an error in the size precision of each mold, as shown in FIG. 10.

In the above-described embodiment, cooling pipes 213 and 214 are introduced into the upper and lower mold members 101 and 102 to make the cooling control. Introducing passages 215 and 216for the introduction of cooling medium are provided in the operation members 201 and 202, respectively, each communicating to cooling medium inlet portions 101C and 102D provided in the upper and lower mold members 101 and 102.

Figure 11:
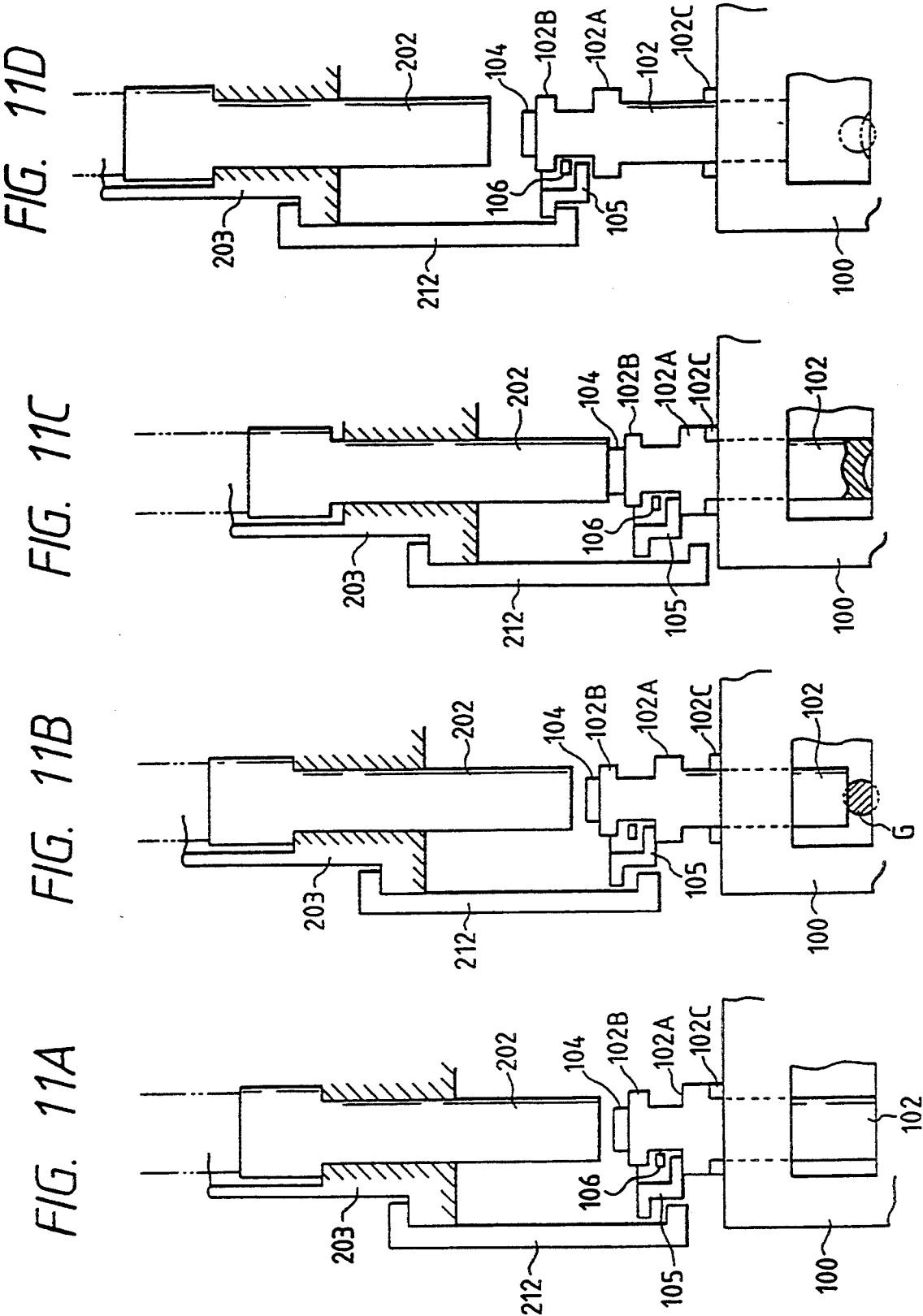
FIGS. 11A, 11B, 11C and 11D are explanation views for pressure molding.

When the glass material is press molded using the press operation mechanism 2, first, the holder block 203 is elevated from the state as indicated in FIG. 11A, with the operation of the cylinder mechanism 210, to thereby lift the upper mold member 102 via the hook member 212, and thus open the mold. The glass material is introduced into the mold 1 with the previously-described suction hand 402, and if the holder block 203 is lowered again, the upper mold member 102 is lowered on the glass material as shown in FIG. 11B. Thereafter, if the cylinder mechanism 210 is further activated to lower the holder block 203, the operation member 202 applies a pressing force via the pressing plate 104 on the central portion of the upper mold member 102 (thereafter, upon cooling, the cylinder mechanism 205 pushes up the operation member 201, and presses the lower mold member 101 upward via ejection member 207). Accordingly, even if there is any clearance necessary for the sliding in a sliding portion between the shell mold 100 and the upper mold member 102, the upper mold member can be lowered in such a state that the posture of the upper mold member is held in the vertical direction. As a result, the press molding can be performed without yielding any positional deviations of molding faces of the upper and lower mold members 101, 102 in the horizontal direction, and in a correct position of the optical functional face of molded optical element with respect to the optical axis.

In particular, in this embodiment, as four upper mold members 102 are driven at the same time with a common cylinder mechanism 210, it is necessary to absorb the dimensional error of the upper mold member 102 and the operation member 202. However, since the operation member 202 is resiliently held by a resilient mechanism 208, it is possible to stop the lowering of the holder block 203, even if the holder block 203 is further lowered after the flange portion 102A of the upper mold member 102 abuts on a top portion of the shell mold 100 via spacer 102C, as shown in FIG. 11C.

The hook member 212 lifts the lifting member 105 when the cylinder mechanism 210 is activated to lift the holder block 203 in order to open the mold after molding, as shown in FIG. 11D. At this time the alignment means is activated for the automatic alignment action, so that the upper mold member 102 is subjected to a lifting force at its center and, therefore, is not inclined in a range of the clearance as above described. As a result, even if there is not sufficient precision of the holder block 203, the lifting member 105 and the flange portion 102B with respect to the shell mold 100, the upper mold member can be lifted vertically without causing any scuffing.

Mold Exchange

The mold exchange chamber 12 is equipped with mold exchange means 7. The mold exchange means 7 has switching means 701 by which the pallet 5 having molds 1 laid and secured thereon is transferred along the guide rail 6A via the gate valve 13 along the guide rail 6B into the molding chamber 3.

The switching means 701 has an actuator 705 via a thrust bearing 704 at its base end portion, as well as a connection hand 703 at a top end of a rod 702 extending into the mold exchange chamber 12. The rod 702 is rotatably operated via L crank 707 by means of a motor 706 equipped in the actuator 705, and can be moved in its longitudinal direction by moving the actuator 705 along the guide rail 708 arranged parallel to the rod 702, when the actuator 705 is driven.

Thus, the rod 702 is rotated with the operation of the motor 706, thereby causing the connection hand 703 to engage or disengage with or from the pallet 5. With the operation of the actuator 705, the pallet 5 can be moved along the guide rail 6A. Thereby, the pallet 5 can be brought via the gate valve 13 to the guide rail 6B of the molding chamber 3, and set at a press position with the press operation mechanism 2, under the control of the switching means 701, or conversely returned back to the mold exchange chamber 12 therefrom.

The mold exchange means 7 is provided with pallet replacement means 711 for moving the pallet 5. The pallet replacement means 711 has a cylinder mechanism 712 with a piston rod 712A moving forward and backward in the directions orthogonal to the longitudinal direction of the guide rail 6A at one end of the mold exchange chamber 12, and is provided with a slide 713 having two stages 713A, 713B at the top end of the piston rod 712A. An opening through which the mold 1 is taken into or out of the chamber, is provided at the other end of the mold exchange chamber 12. A door 12A is provided in the opening.

With the door 12A opened in advance, the cylinder mechanism 712 is operated to move the slide 713 through the opening of the mold exchange chamber 12 to the outside, and for example, the pallet 5 having new molds 1 mounted is laid on the guide rail 6A of the stage 713A. The cylinder mechanism 712 is conversely operated to return the slide 713 to one side of the cylinder mechanism 712 as shown in FIG. 2, then the door 12A is closed, and the gas exchange is performed within the mold exchange chamber 12, whereby the guide rail 6A of the stage 713A is located at the center of the mold exchange chamber 12 (pallet switching position) in this state.

Accordingly, the used molds 1 can be taken, along with the pallet mounting them, out of the molding chamber 3 onto the empty stage 713B, by the operation of the switching means 701. Thereafter, the cylinder mechanism 712 is operated to position the stage 713A at the center of the mold exchange chamber 12, and again the switching means is operated to transfer new molds 1 from the guide rail 6A to the guide rail 6B of the molding chamber 3, along with the pallet 5, so that the new molds 1 are set at the press position of the press operation mechanism 2. The used molds 1 can be taken out by opening the door 12A, after replacement of the new molds 1 into the molding chamber 3.

The switching means 701 and the pallet replacement means 711 may be operated manually without using the actuator. It will be appreciated that the gate valve 13 and the mold exchange chamber may be detachably connected, and the molding exchange chamber 12 may be commonly used for a plurality of molding apparatuses. In this case, the door 12A is not particularly needed, and the molding can be taken in or out through opening portion of connecting portion.

Pallet Temperature Control

The mold is installed on the pallet in advance. The pallet is carried into and installed at the press molding position corresponding to the press operation mechanism, so that the mold is matched with the press operation mechanism indirectly. This is based on the intention of avoiding the decrease in the availability by allowing the exchange operation in a shorter time and simply, when the mold exchange is required due to damage of the mold. In particular, there is a great merit in movement operation by placing the molds on the pallet, because it is troublesome to move the molds from the mold exchange chamber to the molding chamber, or from the molding chamber to the mold exchange chamber, when the press molding is performed in an inert gas atmosphere.

However, when the molds are installed on the pallet, which is then positioned at the press molding position, it is difficult to make the matching between the press operation mechanism and the mold. This is because if the pallet thermally expands due to the influence of ambient temperature, the press operation center of the press operation mechanism may be deviated off the center of the mold, since position setting members for the abutment of the pallet such as pin guides are normally used in positioning the pallet.

The present invention was achieved in view of the above affairs, and provides a position setting apparatus for the mold, in which the pallet is maintained at a predetermined temperature so as not to be affected by the ambient temperature, whereby the positional deviation of the mold due to the thermal expansion is avoided. The matching between the press operation mechanism and the mold can be assured.

To this end, the present invention provides the press position setting apparatus for mold in which the molds are installed on the pallet and the pallet is positioned at the press molding position corresponding to the press operation mechanism. At the press molding position, there are provided position setting members for the abutment of the pallet, and thermostatic and adiabatic means for maintaining the temperature of the pallet at a predetermined temperature.

Figure 12:
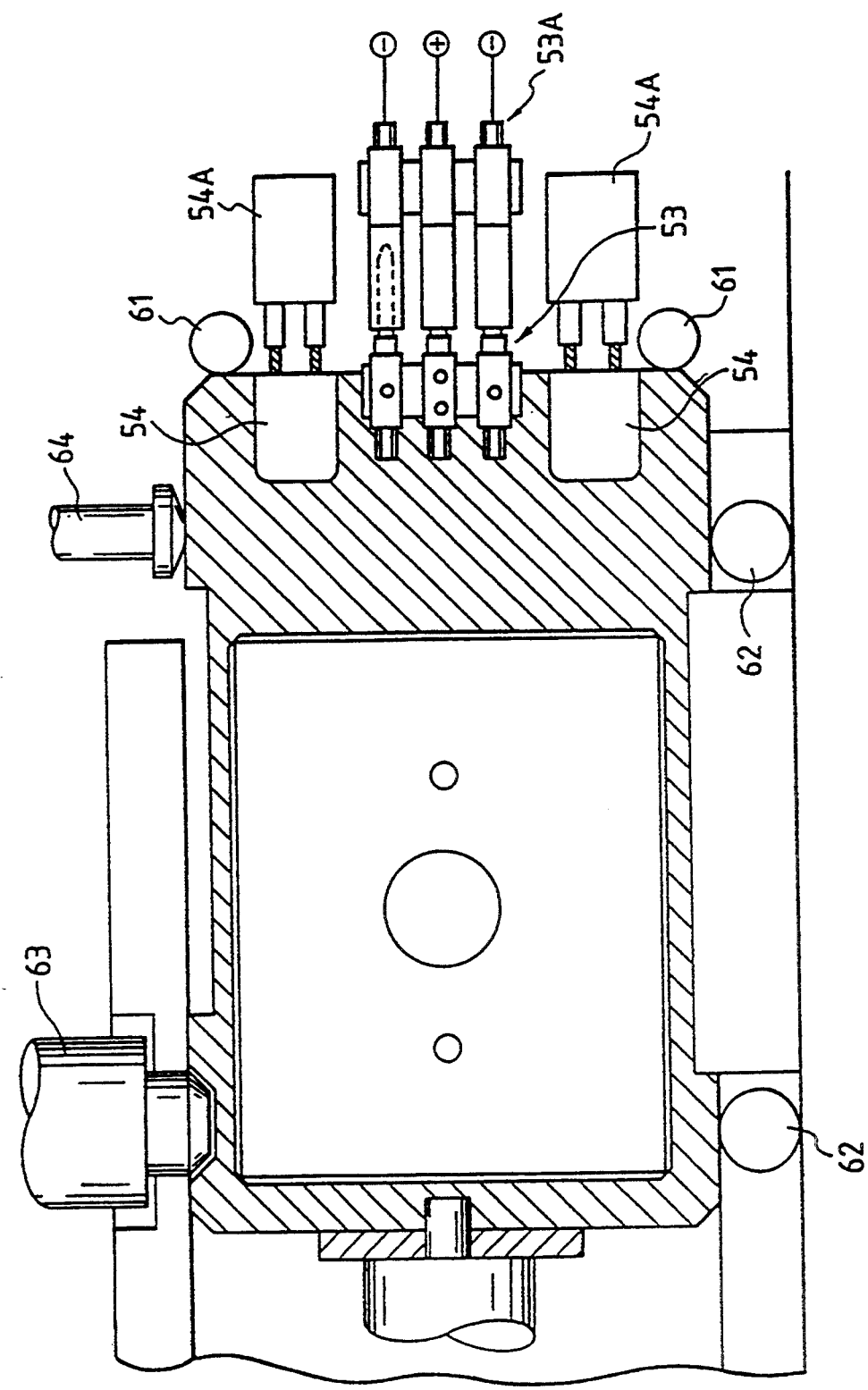
FIG. 12 is an explanation view for the positioning of a pallet according to the present invention.

At the press molding position, there are disposed position setting members 61, 61 such as pin guides against which the top end of the pallet 5 abuts, and similar position setting members 62, 62 against which one end of the pallet 5 abuts, as shown in FIG. 12. Also, to bring one end of the pallet 5 into abutment with the position setting members 62, 62, there are equipped pressure operators 63, 64 at opposed positions.

Figure 13:
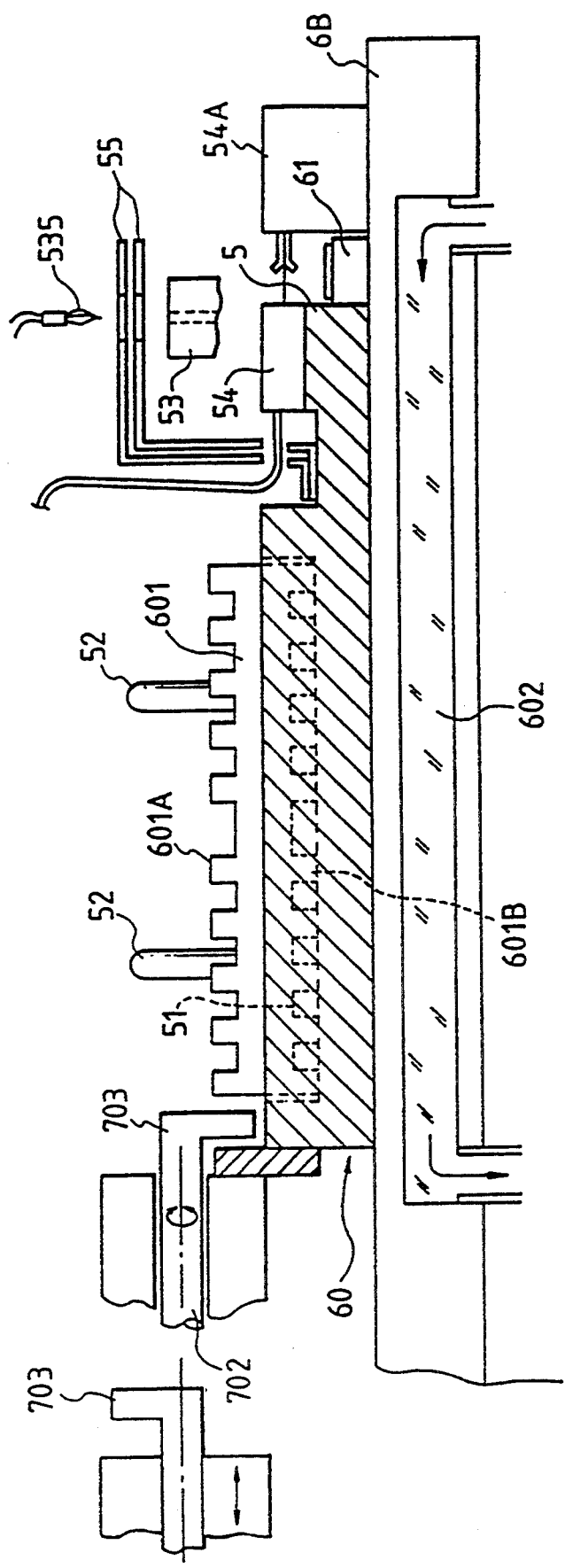
FIG. 13 is an explanation view for the essential parts of the pallet.

In particular, in the present invention, there is prepared thermostatic and adiabatic means 60 so that the pallet 5 may not thermally expand due to the influence of ambient temperature. The thermostatic and adiabatic means 60 in this embodiment is constituted of an adiabatic member 601 provided on the pallet 5 side and a cooling mechanism 602 positioned under the pallet 5 at the press molding position, as shown in FIGS. 12 and 13.

The adiabatic member 601 is constituted of a plate-like ceramic material to be fitted into a oblate slot-like stage 51 provided on the upper surface of the pallet 5. A plurality of strip-like fins 601A, 601B are provided on upper and lower faces. On the pallet 5, the molds 1 are installed on the adiabatic member 601 while being positioned via the guide pins 52 provided on the pallet 5.

Also, a water-cooling type circulation cooling system is adopted in the cooling mechanism 602. A cooling portion in contact with a bottom face of the pallet 5 is only shown in the figure.

Thus, the pallet 5 introduced via the guide rail 6B into the press molding position abuts against the position setting members 61, 61 at its top end, and against the position setting members 62, 62 along its side face with the action of pressure operators 63, 64. Thereby, the molds 1 on the pallet 5 can act to indirectly match the center of upper and lower mold members 101, 102 with the press operation center of the press operation mechanism 2. In this case, the pallet 5 shuts off the heat from the molds 1 with the action of the adiabatic member 601, and is maintained at a predetermined temperature with the action of the cooling mechanism, so that the position of the mold 1 relative to the pallet 5 is not deviated from the regular press position because of having no influence of the thermal expansion.

In the above-described embodiment, at the top end of the pallet 5, there are provided a heating power supply connector 53 on the mold 1 side, and a connector 54 for the temperature sensor (not shown) such as a thermocouple, while at a predetermined position inside the molding chamber, there are provided a power supply connector 53A and a connector 54A to the temperature detector apparatus (not shown).

Figure 15:
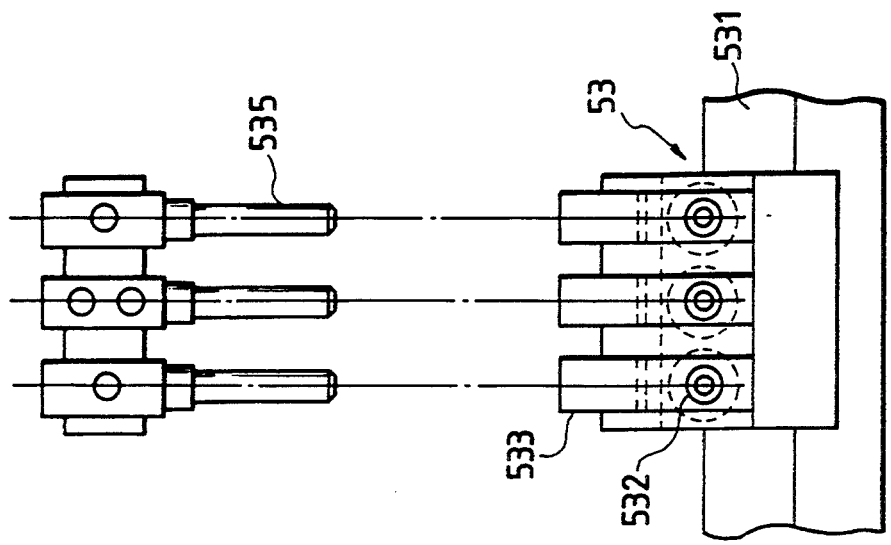
FIGS. 14 and 15 are explanation views for a connector according to the present invention.
Figure 14:
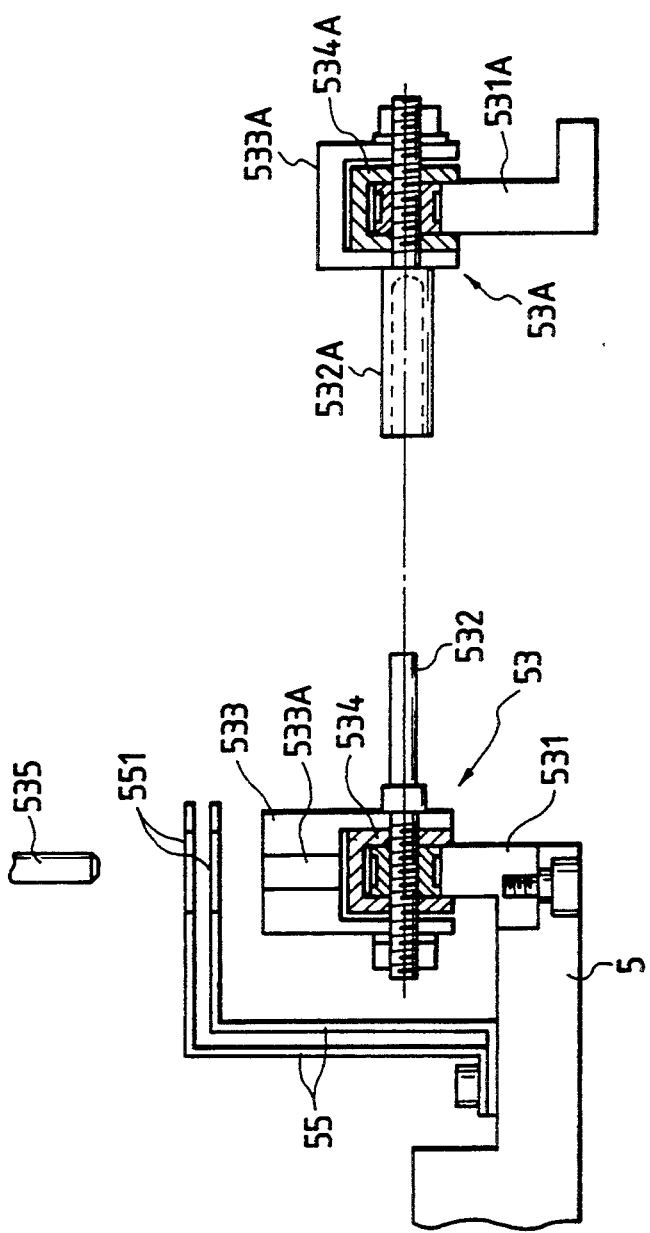

The connector 53 is such one that, for example, a connector pin 532 is attached into a support block 531 made of an insulating material such as Teflon (trade name) as shown in FIGS. 14 and 15, via a terminal block 533 in electrical connection with the connector pin 532 and a common connector block 534 made of similar insulating material as above described. A connector pin 535 is inserted releasably through a connecting hole 533A formed on the terminal block 533 from the side of the mold 1. Also, the connector 53A is one in which a female connector 532A is also inserted into a support block 531A made of an insulating material via a terminal block 533A in electrical connection with the female connector 532A and a common connecting block 534A made of an insulating material. The pallet 5 is introduced along the guide rail 6B into the press molding position, and when it abuts against the position setting members 61, 61, the connector pin 532 is connected to the female connector 532A.

Also, at the top end of the pallet 5, a reflector consisting of an L-shaped plate member 55 having an insertion hole 551 for inserting the connector pin 535 therethrough is attached in this embodiment, so that these connectors may not be affected by the heat from the molds 1.

Next, using the press molding apparatus according to the present invention, a process of molding an optical element especially from the glass material will be specifically described in the order of carrying in, molding and carrying out. The optical element molded herein is an aspherical lens for use with a camera or a video camera.

The glass material G is a glass blank preformed as a sphere, and is first placed on a pallet 20C of a stocker 20. And if its rotational axis is rotated 180 degrees with the driving of the electric motor 20B, the robot 19 is activated to bring the suction hand 193 to that position, where one glass material is sucked from the pallet 20C and held therein. Next, with the operation of the robot 19, the suction hand 193 places the glass material G on the stand 172. By repeating this operation four times, four glass materials are placed on the stand 172. The glass materials on the stand 172 are preheated to an appropriate temperature, and carried into the molding chamber 3 with the action of the carrying in/out means 17 as previously described. The glass materials are adsorbed and held by the suction pad 403 of switching means 4 heated up to, for example, about 400° C., and introduced into the molds 1. Herein, the upper and lower mold members 101, 102 are preheated to temperatures high enough to obtain, $10^{16}$ poises in glass viscosity. And the upper mold member 102 is lowered with the action of the cylinder mechanism 210, as previously described. The glass materials are heated up to temperatures high enough to reach about $10^{10.5}$ poises in glass viscosity by the action of the electric heater (not shown) in a state of the glass material G being sandwiched between the upper and lower mold members 101, 102 (the temperature of the lower mold member 101 heats the glass materials to reach about $10^{9.5}$ poises in glass viscosity, and the temperature of the upper mold member 102 heats the glass materials to reach about $10^{-10.0}$ in glass viscosity). And, a load of 400 kg is applied on the upper mold member 102 to perform the press molding. After the flange portion 102A makes sufficient contact with an upper end of the shell mold 100 via a spacer 102C, a cooling medium is introduced into cooling medium introducing portions 101B, 102D of the upper and lower mold members 101, 102, and the pressure is applied from beneath the lower mold member 101, to reach about $10^{10.5}$ and $10^{13}$ poises in glass viscosity. Then, the cooling is continued, and if the temperature of the molding heats the glass materials to about $10^{14.5}$ poises in glass viscosity, the upper and lower mold members are caused to have a temperature difference (the upper mold member being made at lower temperature) under the control of the electric heater (not shown) and by the action of the cooling medium introduced into the introducing portions 101C, 102D, so that the temperature of the molded product is decreased down to reach about $10^{16}$ poises in glass viscosity. The upper mold member 102 is lifted, the mold is opened, and the molding is taken out from between the lower mold member 101 and the upper mold member 102 by means of the suction pad 403.

Thereafter, the molded product is returned to the stand 172, by the reverse operation of the switching means 4, and taken out from the molding chamber 3 by means of carrying in/out means 17. Further, it is placed temporarily on the cooling platform 21 by the robot 19, and taken outside after cooling down to appropriate temperature.

While in this embodiment, the mold 1 consists of four pairs of upper and lower mold members 101, 102 which are operated within a common shell mold 100, it will be appreciated that one pair of upper and lower mold members 101, 102 can be adopted with a structure of the alignment means 106, as shown in FIG. 8.

Figure 5:
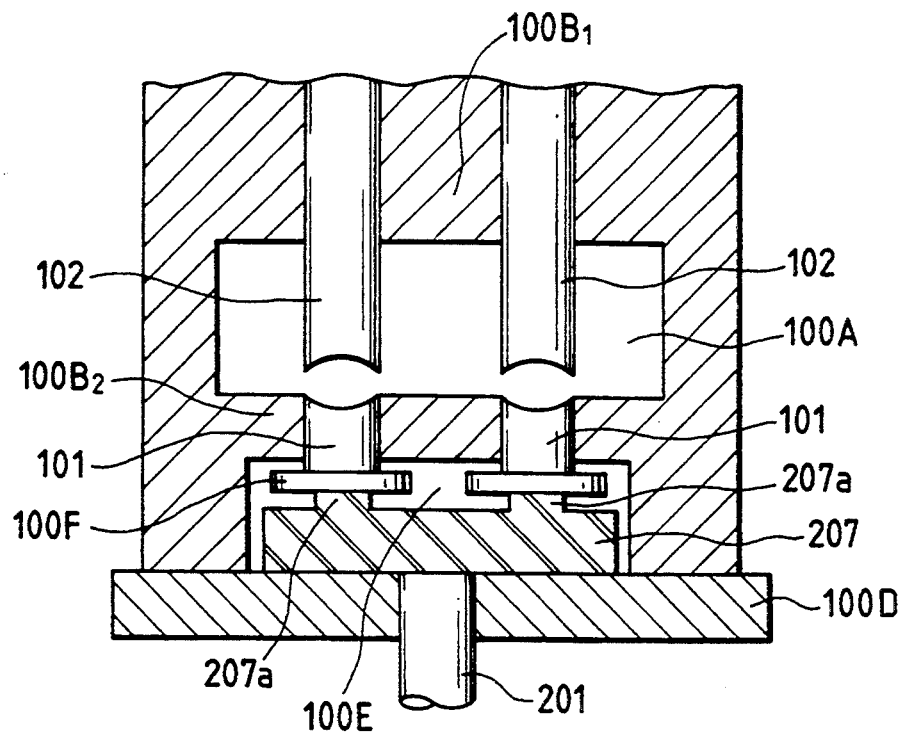
FIG. 5 is an explanation view for the essential parts as shown in FIG. 4.
Figure 16:
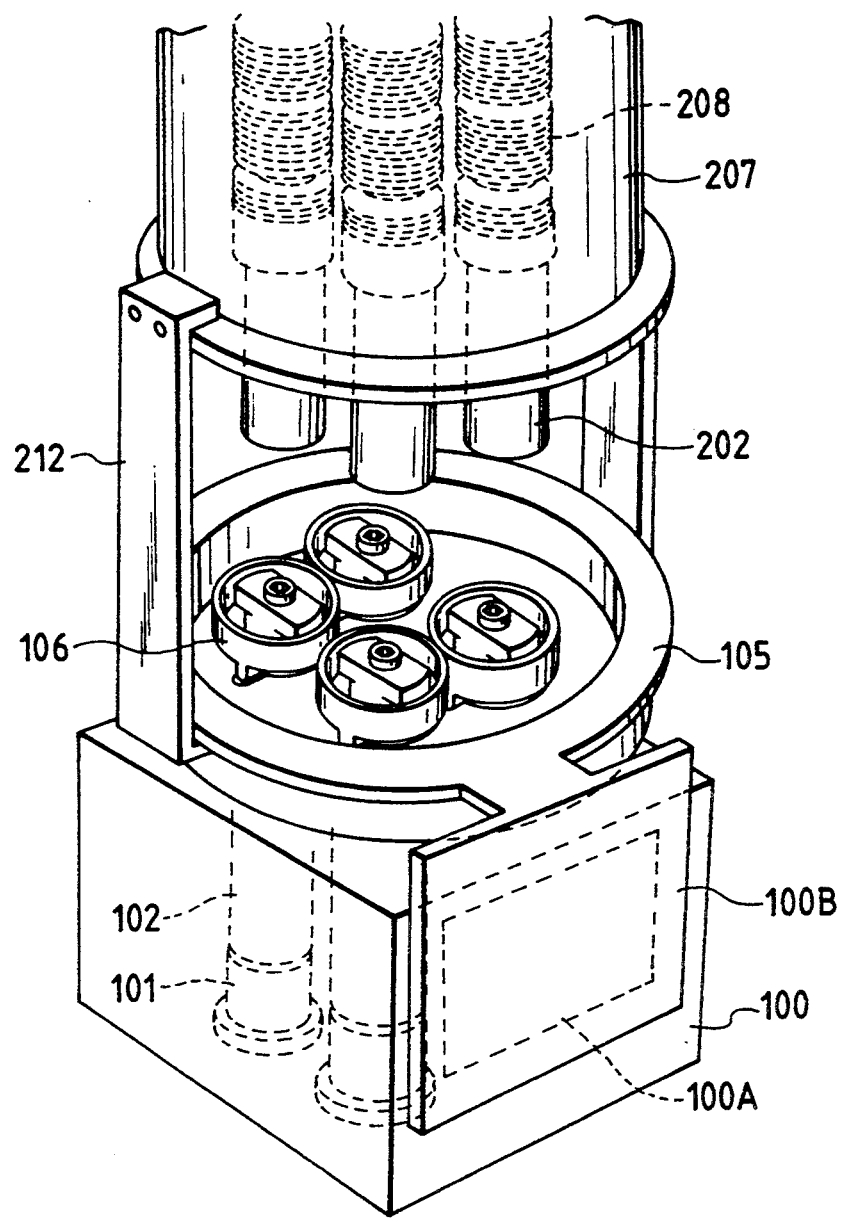
FIG. 16 is an explanation view for a shutter for opening and closing an opening portion of a shell mold.
Figure 17:
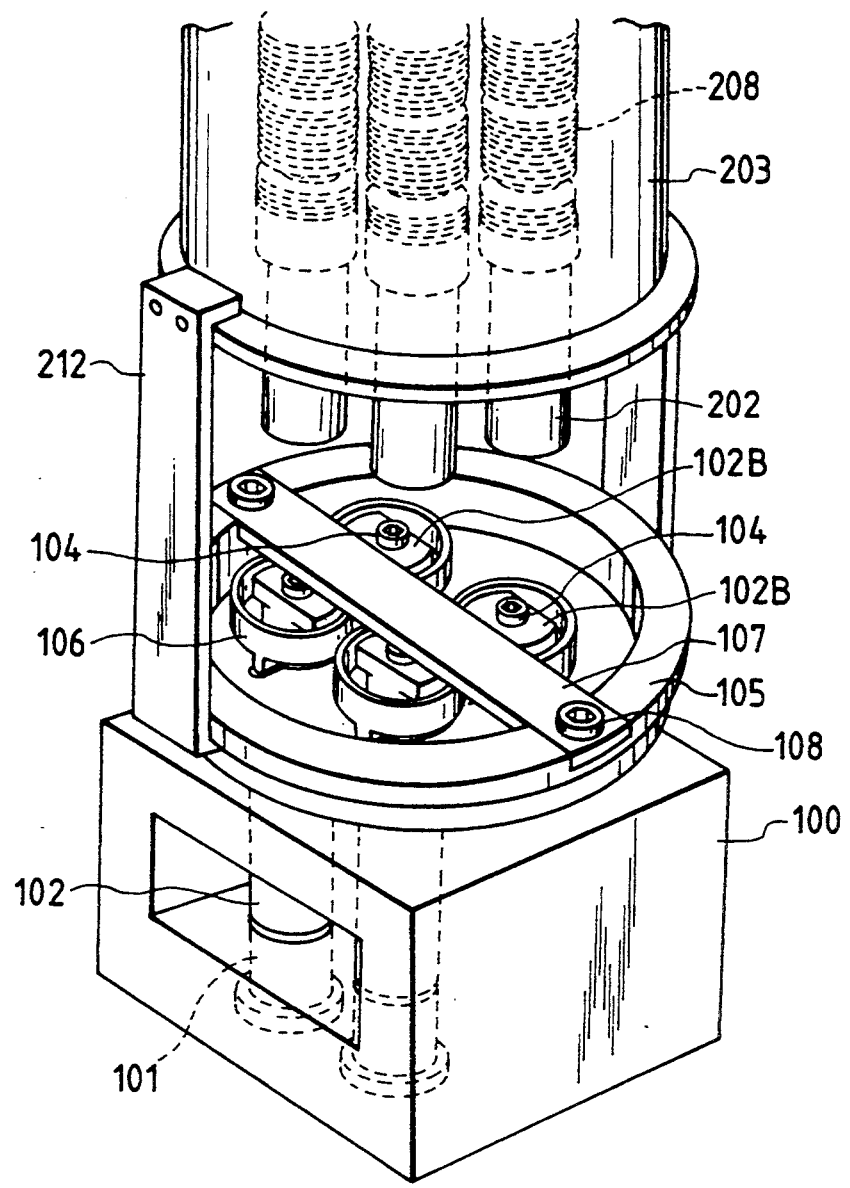
FIGS. 17 to 21 are views showing a variation of a molding apparatus.
Figure 18:
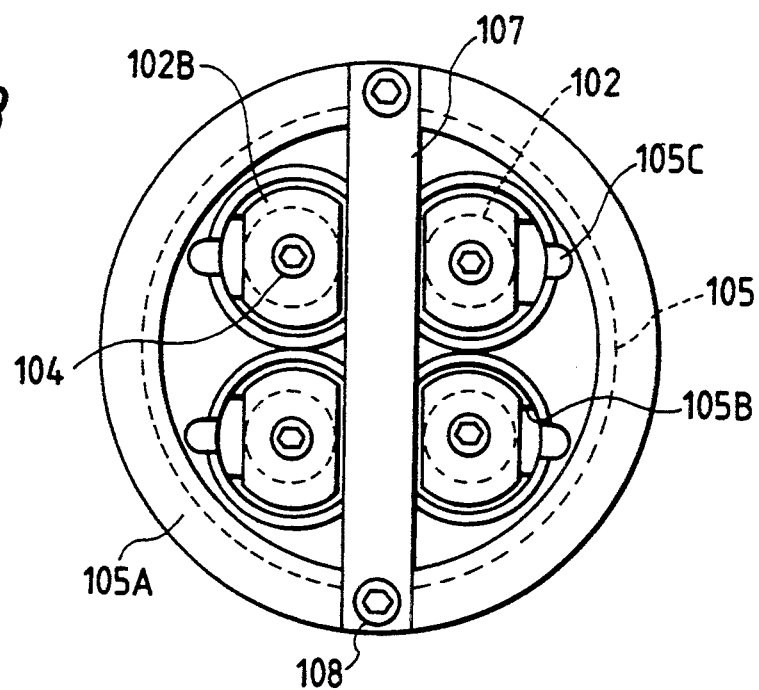

According to the present invention as described above, the apparatus is so constructed that the upper mold member slidable in the shell mold may be operated via an intermediate pressing member by an operation member so as to exert the pressure on the center of the upper mold member in parallel with a slidable face of the shell mold, and a hook member hung on the operation member is interlocked via an alignment member so as to exert a lifting force on said center, therefore, when the glass material is press molded and the molded product is released from the mold, the force applied to the upper mold member can always act through a center of the upper mold member. As a result, a high precision optical element whose optical functional face is aligned correctly with respect to the optical axis can be produced efficiently. FIG. 16 shows an improvement in the apparatus of the embodiment as shown in FIGS. 3 to 5.

Since the temperature control inside the shell mold in the press molding process is necessary to be performed very strictly, the temperature distribution within the shell mold must be held more uniformly. Therefore, it is required to avoid the heat radiation through the inlet/outlet port to the exterior. Since the glass material carried in has a large exposed portion away from the molding face such as with a ball blank, there is a risk that the influence of the heat radiation may be greatly applied. Therefore, immediately after being carried into the shell mold, it is necessary to close the inlet/outlet port as soon as one can.

The present invention was achieved in view of the above affairs, and provides a press molding apparatus for an optical element, comprising at least a plurality of pairs of mold members for a common shell mold, wherein the apparatus is capable of maintaining an even temperature within the shell mold in such a manner that when press molding the glass material with its upper mold member being slidably operated, the inlet/outlet port for the glass material or molding formed in the shell mold can be opened or closed timingly in conjunction with the operation of the operation member for the upper mold member.

FIG. 16 shows a molding apparatus having a shutter 100B for opening or closing the opening portion 100A of the shell mold 100, wherein the shutter 100B is connected to the lifting member 105, and operated along with the lifting of the lifting member.

Thus, when the glass material is press molded using the press operation mechanism 2, first, the holder block 203 is raised from the state as indicated in FIG. 11A, with the operation of the cylinder mechanism 210, to lift the upper mold member 102 via the hook member 212, and thus make opening of the mold. Then, the shutter 100B is lifted by means of a lifting member 105, so that the inlet/outlet port 100A is opened. And the glass material is introduced into the mold 1 with said suction hand 402, and the holder block 203 is lowered again, so that the upper mold member 102 is lowered on the glass material as shown in FIG. 11B. Then, the shutter 100B closes timingly the inlet/outlet port 100A, and prevents the heat radiation from the shell mold to the outside.

FIGS. 17 to 21 show a variation of the molding apparatus as shown in FIGS. 3 to 8.

In the figure, the upper mold member 102, which is circular in cross-section, has an intermediate pressing member 104 of smaller diameter centrally located at its top portion, whereby when the operation member 202 is lowered, the pressure is applied to its center. Also, the upper mold member 102 is provided with the flange portion 102B of non-circular cross-section at its upper portion. A conical lifting member 105 is laid on the flange portion 102A. And between the flange portion 102B and the lifting member 105 is interposed alignment means 106 so that the lifting force may be exerted at the center of the upper mold member. The lifting member 105 has a strip-like rotation preventing member 107 secured by a screw 108, centrally passing therethrough, as specifically shown in FIG. 19, and with its side face corresponding to the side face of each flange 102B, it serves to prevent the rotation of the upper mold member 102 with respect to the lifting member 105. The lifting member 105 is provided with a through hole 105B for inserting the flange portion 102B, with a phase difference of 90 degrees in a rotational direction relative to the rotation preventing position as above described.

Figure 20:
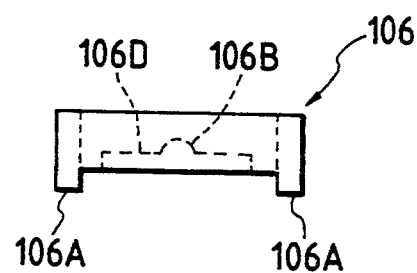
Figure 21:
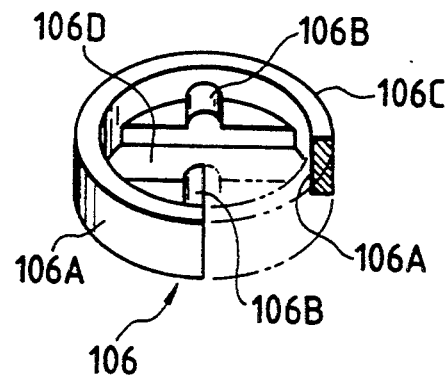
Figure 19:
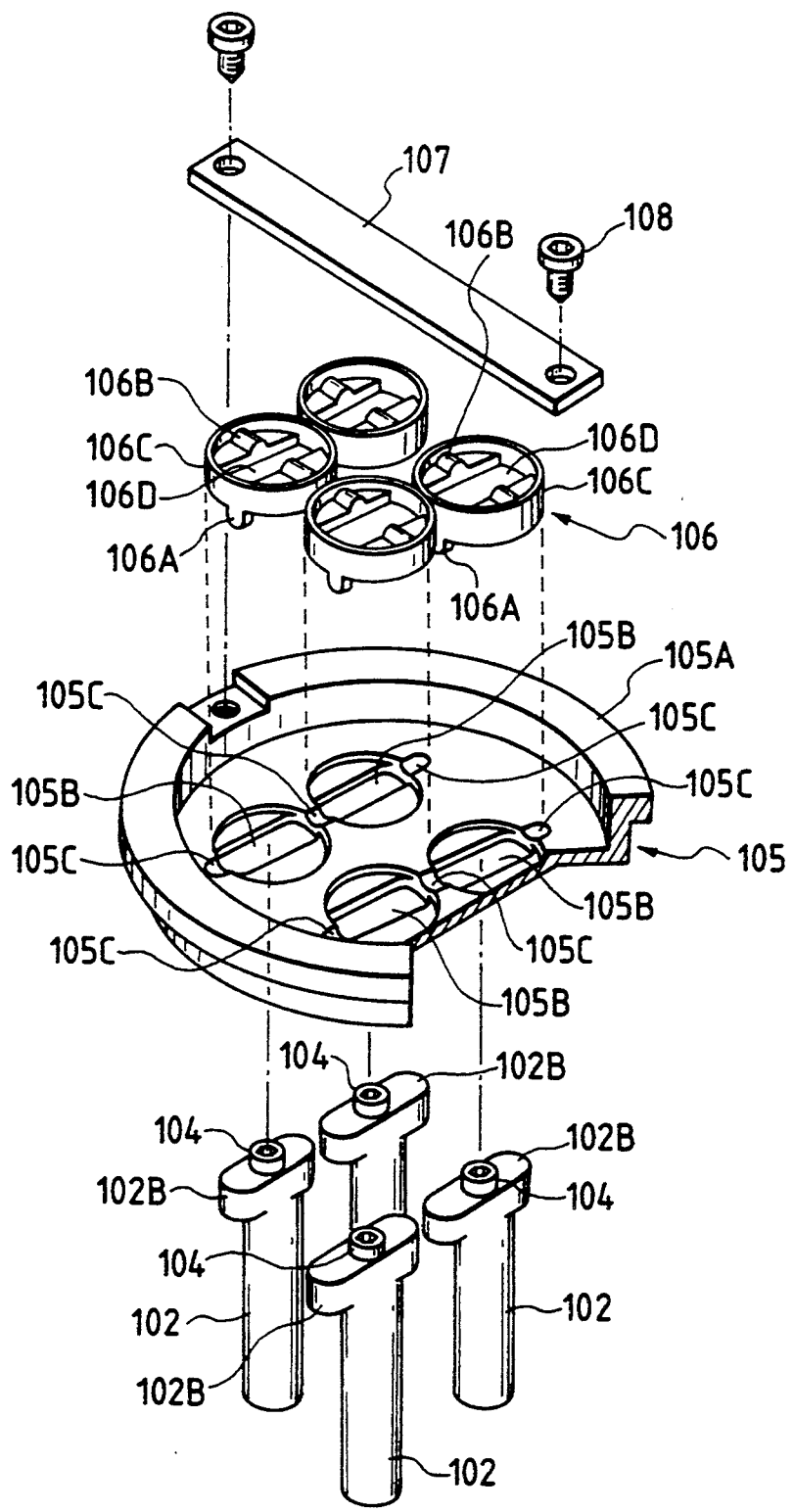

The alignment means 106 is constructed so that each one pair of semispherical projecting support portions 106A and 106B disposed with a phase difference of 90 degrees from each other in a plane orthogonal to a sliding direction of the upper mold member 102, is provided on the ring 106C, as shown in FIGS. 20 and 21, corresponding to the upper mold member 102 and the lifting member 105. Also, in the center of the ring 106C, a through hole 106D is provided to insert the flange portion 102B of the upper mold member 102 therethrough, as shown in FIGS. 6 and 7. The lifting member 105 is provided with a support slot 105C for receiving the support portion 106B.

Therefore, when assembling the upper mold member 102 on the lifting member 105 and the alignment means 106, the flange portion 102B of the upper mold member 102 is inserted through the insertion holes 105B and 106D from its underside, and protruded to the upper side, whereby in this state, the flange portion 102B is rotated 90 degrees to thereby make its lower face to be supported against the support portion 106A. Thereafter, by mounting the rotation preventing member 107 onto the lifting member 105, the relative position between the upper mold member 102 and the alignment means 106 is held. In this case, the relative position between the lifting member 105 and the alignment means 106 can be assured if the support portion 106B is entered into the support slot 105C.

What is claimed is:

1. An apparatus for molding an optical element, comprising:
   an upper mold and a lower mold for pressing a glass material therebetween;
   a guide member for guiding said upper mold and said lower mold; and
   alignment means for causing said upper mold to slide into a guide hole of said guide member, said alignment means comprising;
   a movement member for vertically moving said upper mold in a guiding manner; and
   an alignment member disposed between said movement member and said upper mold and for aligning a posture of said upper mold in at least two orthogonal planes perpendicular to a movement axis of said upper mold.

2. An apparatus according to claim 1, wherein
   said guide member has a hole for guiding a plurality of said upper molds;
   said movement member simultaneously moves the plurality of said upper molds in a guiding manner; and
   said alignment member is provided on each of the plurality of said upper molds.

3. An apparatus for molding an optical element, comprising:
   a plurality of sets of molds, with each set having an upper mold and a lower mold;
   a member for guiding said upper mold and said lower mold in said plurality of sets of molds;
   first means for generating pressure for pressing said upper molds;
   second means for generating pressure for pressing said lower molds;
   a first pressure concentrating member for concentrating the pressure of said first pressure generating means at a center of each said upper mold in an axial direction; and
   a second pressure concentrating member for concentrating the pressure of said second pressure generating means at a center of each said lower mold in the axial direction.

4. An apparatus according to claim 3, further comprising a member for receiving the pressure of said second pressure generating means and distributing the pressure of said second pressure generating means to each said lower mold.

5. An apparatus according to claim 4, further comprising a member provided between each said lower mold and said pressure distributing member for adjusting a movement stroke of each said lower mold.

6. An apparatus for molding an optical element by heating and pressing a glass material, said apparatus comprising:
a plurality of upper molds and lower molds for simultaneously molding a plurality of optical elements, each said upper and lower molds having a longitudinal axis;
a shell mold for moving and guiding said plurality of upper molds relative to said lower molds along the respective longitudinal axes, said shell mold having a position at which a stop position of said upper molds is determined;
means for generating a pressure load; and
pressure transmitting means for pressing said plurality of upper molds to a fixed position of said shell mold by the load from said pressure load generating means, said pressure transmitting means comprising a plurality of pressure members for applying the load from said pressure load generating means to each said upper mold, a holder member for holding each said pressure member and a spring member for transmitting the pressure of said pressure load generating means to each said upper mold.

7. An apparatus according to claim 6, wherein said spring member includes means for adjusting a spring constant to adjust the pressure acting on each said upper mold.

8. An apparatus according to claim 6, wherein said spring member comprises a conical spring.

9. An apparatus according to claim 6, wherein each pressure member forms a passage for supplying a cooling medium to each said upper mold.

10. An apparatus according to claim 9, wherein the cooling medium from each said pressure member is supplied via an intermediate pressure transmitting member receiving the pressure from said spring member to each said upper mold.

11. An apparatus for molding a glass molding, comprising:
molding chamber for molding a glass material by pressing the glass material with a first mold set comprising an upper mold and a lower mold, and a shell mold;
a mold exchange chamber provided with a second mold set comprising of an upper mold, a lower mold, and a shell mold; and
means for exchanging said first mold set with said second mold set.

12. An apparatus according to claim 11, further comprising:
a guide rail with which said molding chamber and said mold exchange chamber are connected; and
a pallet movable on said guide rail with each mold set carried thereon.

13. A method of exchanging a mold member for molding a glass molding by heating and pressing a glass material, by means of an apparatus comprising:
a molding chamber for accommodating a first mold set comprising an upper mold, a lower mold, and a shell mold for use in pressing the glass material; and
a mold exchange chamber for accommodating a second mold set having an upper mold, a lower mold, and a shell mold to be exchanged with said first mold set;
said method comprising the steps of:
press molding the glass material at predetermined temperatures with the first mold set within the molding chamber;
preparing the second mold set in the mold exchange chamber;
introducing the first mold set into the mold exchange chamber after a plurality of press moldings with the first mold set within the mold chamber; and
introducing the second mold set within the mold exchange chamber into the mold chamber.

* * * * *

UNITED STATES PATENT AND TRADEMARK OFFICE
CERTIFICATE OF CORRECTION

PATENT NO. : 5,417,730
DATED : May 23, 1995
INVENTOR(S) : Shigyo et al.

It is certified that error appears in the above-indentified patent and that said Letters Patent is hereby corrected as shown below:

On title page,
[56] REFERENCES CITED:

U.S. PATENT DOCUMENTS, "4,606,705  8/1986  Torii et al." should read --4,606,750  8/1986  Torii et al.--.

COLUMN 7:

Line 22, "rail 8," should read --rail 6B,--.

COLUMN 16:

Line 23, "to" should read --to reach--.

COLUMN 20:

Line 11, "of" should be deleted.

Signed and Sealed this

Tenth Day of October, 1995

Attest:

BRUCE LEHMAN

Attesting Officer        Commissioner of Patents and Trademarks